United States Patent [19]

Ando

[11] Patent Number: 4,930,793
[45] Date of Patent: Jun. 5, 1990

[54] KEYLESS CHUCK

[75] Inventor: Takaharu Ando, Aichi, Japan

[73] Assignee: Emu-Esu Industrial Co., Ltd., Nishio, Japan

[21] Appl. No.: 163,542

[22] Filed: Mar. 3, 1988

[30] Foreign Application Priority Data

Nov. 9, 1987 [JP] Japan .............. 62-171905

[51] Int. Cl.$^5$ .............................. B23B 31/12
[52] U.S. Cl. ................. 279/61; 279/1 K; 279/62; 408/240
[58] Field of Search .............. 279/60, 61, 62, 1 K, 279/63, 64; 81/128; 192/67 R, 108; 408/139, 140, 240; 464/38, 39, 40; 173/119, 120, 122

[56] References Cited

U.S. PATENT DOCUMENTS

| | | | |
|---|---|---|---|
| 1,835,180 | 12/1931 | Parsons | 173/119 |
| 2,684,856 | 7/1954 | Stoner | 279/61 |
| 3,068,667 | 12/1962 | Sussman | 464/39 X |
| 4,682,918 | 7/1987 | Palm | 279/1 K X |
| 4,840,387 | 6/1989 | McCarthy | 279/1 K |

Primary Examiner—Z. R. Bilinsky
Assistant Examiner—Robert Schultz
Attorney, Agent, or Firm—Cushman, Darby & Cushman

[57] ABSTRACT

A keyless chuck for fastening or releasing a tool, in which a plurality of oblique holes are formed in a body, jaws are inserted into these holes, and a nut engaging with rear portions of the jaws is rotated in a normal or a reverse direction so that the jaws either advance or retreat. This keyless chuck is provided with a grip member loosely fitted around the outer periphery of the body, a pair of opposed groups of lugs provided on the nut and the grip member and capable of engaging with or disengaging from each other, and at least one spring provided on one of the groups of engaging portions and adapted for constantly urging this group of engaging portions toward the other. If the grip member is fixed, the nut is rotated in the opposite direction relative to the body so as to make the jaws advance or retreat, thereby fastening or releasing the tool. If, in the fastening operation, the torque exceeds a certain value, the groups of engaging portions are disengaged and are again engaged with each other by the spring so that the nut is rotated impulsively, thereby further increasing the fastening force.

2 Claims, 5 Drawing Sheets

FIG. 14A  FIG. 14B
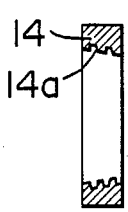 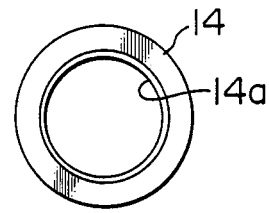
FIG. 15A  FIG. 15B
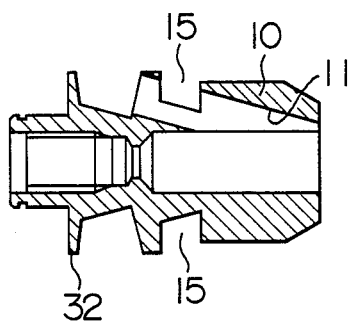 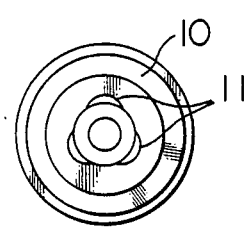
FIG. 16A  FIG. 16B
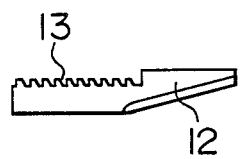 

FIG. 17A  FIG. 17B
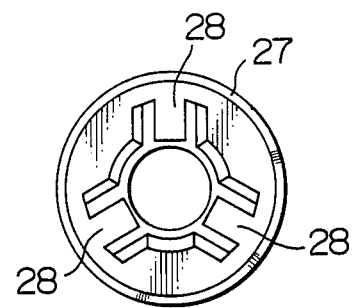
FIG. 18A  FIG. 18B  FIG. 19
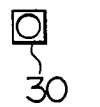  
FIG. 20
PRIOR ART
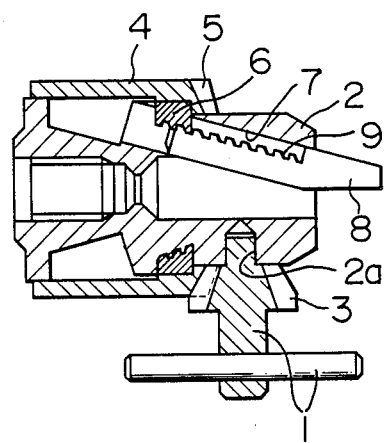
FIG. 21
PRIOR ART
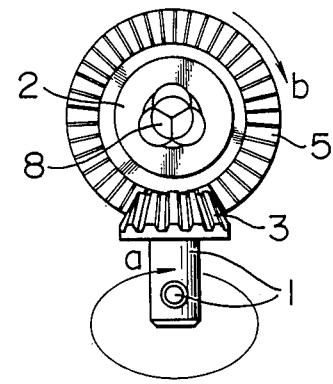

KEYLESS CHUCK

BACKGROUND OF THE INVENTION

1. Field Of The Invention

This invention relates to a keyless chuck, such as a drill chuck, having jaws for holding various tools.

2. Description Of The Prior Art

One type of conventional drill chuck, such as that shown in FIG. 20 and 21, has jaws for holding a tool that are opened or closed by the rotary operation of a chuck key. That is, as shown in FIG. 20, a chuck key 1 is rotatably and detachably inserted into a key hole 2a formed in a body 2. If the chuck key 1 is rotated in the direction indicated by the arrow (a) in FIG. 21, a sleeve 4 which is rotatably mounted on the body 2 is rotated clockwise (b) by a bevel gear 3 engaged with a gear 5 formed on the sleeve 4. A nut (6) which is press-fitted into and fixed to the sleeve 4 is thereby rotated in one direction. Three oblique holes 7 are formed in the body 2 to be arranged in the peripheral direction thereof, a jaw 8 is slidably accommodated in each oblique hole in the longitudinal direction thereof, and an external thread 9 formed on each jaw 8 is meshed with the nut 6, enabling the three jaws 8 to advance and fasten a tool by the rotation of the nut 6 effected in the above-described manner. If the chuck key 1 is rotated in the opposite direction, the nut 6 rotates counterclockwise so that the jaws 8 retreat and release the tool.

This type of conventional device is disadvantageous in terms of operability because the chuck key 1 must be fitted into the key hole 2a formed in the body 2 and it must thereafter be rotated by manual operation. Another problem relates to inconvenience in terms of the maintenance of the device since the chuck key 1 is provided separately from the body and it tends to become lost. If it is lost, the drill chuck cannot be used.

SUMMARY OF THE INVENTION

It is therefore an object of the present invention to provide a drill chuck in which the jaws can be opened or closed by using the rotational force of the body, supplied from a motor, whereby the fastening force of the jaws can be effectively intensified by the rotational force, thereby solving the above-described problems.

To this end, the present invention provides a keyless chuck in which a plurality of oblique holes are formed in a body, jaws are inserted into these holes, and a nut engaging with rear portions of the jaws is rotated in a normal or a reverse direction so that the jaws either advance to fasten a tool or retreat to release the tool, the keyless chuck having a grip member loosely fitted around the outer periphery of the body, a pair of opposed engaging means which are provided on the nut and the grip member and which are capable of engaging with or disengaging from each other, and at least one spring which is provided for one of the pair of engaging portions and which is adapted for constantly urging that engaging means toward the other engaging means.

If the body of the keyless chuck is being rotated by an electric motor and if, in this state, the operator grasps the grip member so as to stop the rotation thereof, the nut is also stopped by the engagement between the engaging means formed on the grip member and the nut. The nut thereby starts to rotate relative to the jaws in the direction opposite to that in which the jaws are rotating together with the body. It is therefore, possible to perform a fastening operation by, for example, rotating the body in the normal direction and grasping the grip member so as to make the jaws advance by means of the nut, and it is possible to perform a releasing operation by rotating the body in the reverse direction and grasping the grip member so as to make the jaws retreat by means of the nut. If the torque of the fastening force increase to a certain magnitude near the end of the fastening operation, the engaging means on the nut is disengaged from the engaging means on the grip member by the rotational force, and, after this disengagement, it is again advanced to the engaging position by the force of the spring so that engaging portions of this engaging means collide against next mating engaging portions of the engaging means on the grip member. This collision forcibly rotates the nut further in the fastening direction, thereby further increasing the fastening force of the jaws. In an initial stage of the releasing operation, the engaging portions collide against each other in a manner similar to that described above, thereby facilitating the loosening of the jaws.

Thus, the operation of fastening or releasing a tool is performed by the rotation of a power unite and the simple action of grasping the grip member. Therefore, this operation can be performed very easily and more speedily compared with the conventional chuck key operation, thereby improving operability and enabling an increase in the force employed to fasten the tool to securely hold it.

In addition, since the tool can be fastened or released by the operation of grasping and stopping the grip member mounted on the body, no problems such as the loss of the chuck key used for the conventional structure occurs. The present invention is effective in terms of maintenance, and there is no possibility of the operation becoming disabled by such a loss. Therefore, the present invention can be suitably applied to a portable power tool.

BRIEF DESCRIPTION OF THE DRAWINGS

FIGS. 1 to 10 show a first embodiment of the present invention;

FIG. 1 is a sectional side view of the assembly;

FIG. 2 is a front view of the assembly;

FIG. 8 is a sectional view of a spring;

FIG. 9 is a front view of a retaining ring;

FIGS. 11 to 18 show a second embodiment of the present invention;

FIG. 11 is a sectional side view of the assembly;
FIG. 12 is a front view of the assembly;
FIG. 14(A) is a sectional side view of a nut;
FIG. 14(B) is a front view of the nut shown in FIG. 14(A);
FIG. 15(A) is a sectional side view of a body;
FIG. 15(B) is a front view of the body shown in FIG. 15(A);
FIG. 16(A) is a side view of a jaw;
FIG. 16(B) is a front view of the jaw shown in FIG. 16(A);
FIG. 17(A) is a sectional side view of a case;
FIG. 17(B) is a front view of the case in FIG. 17(A);
FIG. 18(A) is a bottom view of an engagement member;
FIG. 18(B) is a sectional side view of the engagement member shown in FIG. 18(A);
FIG. 19 is a sectional side view of a spring;
FIG. 20 is a sectional side view of an assembly of a conventional construction;
and
FIG. 21 is a front view of the assembly shown in FIG. 20.

DESCRIPTION OF THE PREFERRED EMBODIMENTS

A first embodiment of the present invention will be described below with reference to FIGS. 1 to 10.

Figure 1:
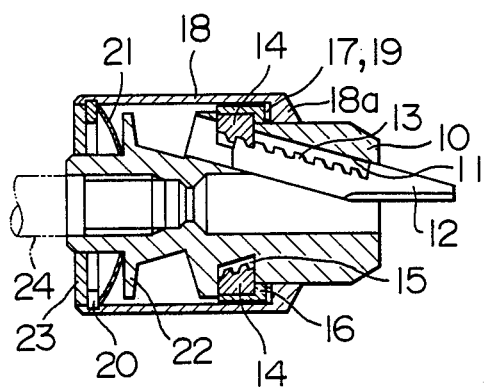
Figure 3A:
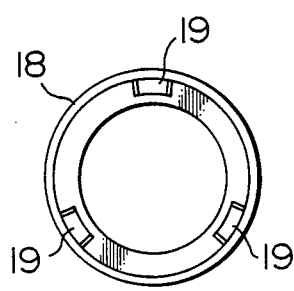
FIG. 3(A) is a rear view of a sleeve.
Figure 3B:
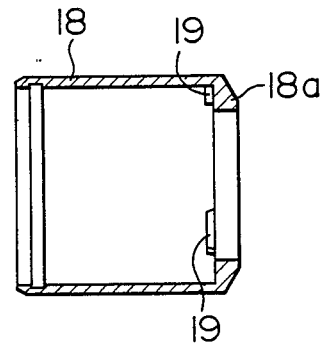
FIG. 3(B) is a sectional side view of the sleeve shown in FIG. 3(A)
Figure 4A:
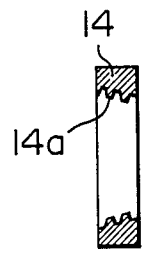
FIG. 4(A) is a sectional side view of nut.
Figure 4B:
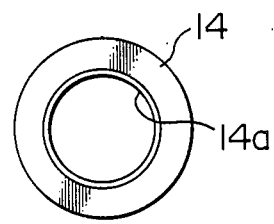
FIG. 4(B) is a front view of the nut shown in FIG. 4(A)
Figure 5A:
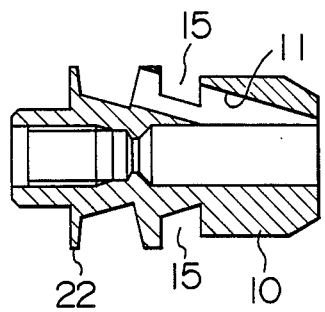
FIG. 5(A) is a sectional side view of a body.
Figure 5B:
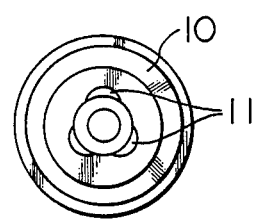
FIG. 5(B) is a front view of the body shown in FIG. 5(A)
Figure 6A:
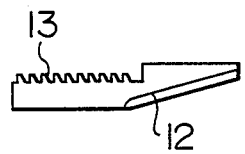
FIG. 6(A) is a side view of a jaw.
Figure 6B:
FIG. 6(B) is a front view of the jaw shown in FIG. 6(A)
Figures 7A, 7B:
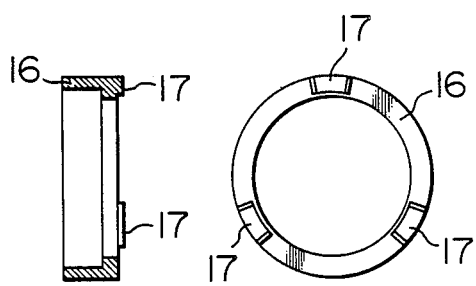
FIG. 7(A) is a sectional side view of an engagement ring.
FIG. 7(B) is a front view of the engagement ring shown in FIG. 7(A)
Figure 8:
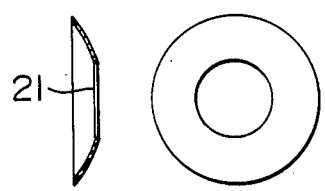
Figure 9:
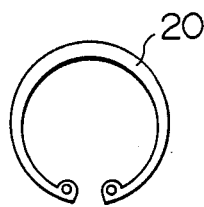
Figure 10A:
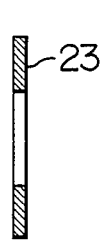
FIG. 10(A) is a sectional side view of a washer-like plate.
Figure 10B:
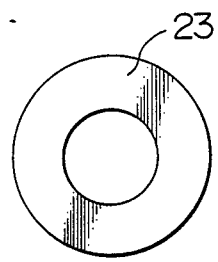
FIG. 10(B) is a front view of the washer-like plate shown in FIG. 10(A)
Figure 11:
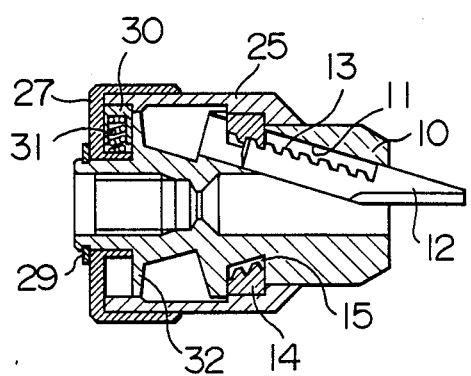
Figure 12:
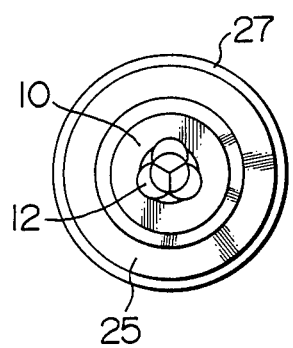

Referring first to FIG. 5, a body 10 has three holes 11 which are oblique relative to the axis of the body and which are arranged in the peripheral direction at equal intervals. Jaws 12 which are slidably inserted into the three oblique holes 11 are provided with external threads 13, as shown in FIG. 6. A nut 14 is in the form of a ring and has an internal thread 14a formed on its internal surface. The nut is loosely fitted to a groove 15 formed in the body 10 while being in engagement with the external threads 13 of the three jaws 12 inserted into the body 10. An engagement ring 16 has plurality drivingside lugs 17 arranged at equal intervals in the peripheral direction and integrally formed on its front side and at its outer periphery, as shown in FIG. 7. The engagement ring 16 is integrally fixed to the nut 14 by press fitting or in a like manner, as shown in FIG. 1. Each lugs 17 on the driving side is a projection having a trapezoidal profile and tapered surfaces formed at its peripheral-direction ends. A sleeve 18 is rotatably fitted around the outer periphery of the body 10 and is also rotatable relative to the outer peripheral surface of the engagement ring 16. The sleeve 18 is in the form of a cylinder with a front wall 18a, and three driven-side plurality lugs 19 which can be brought into engagement with the driving-side lugs 17 of the engagement ring 16 are integrally formed on the inner surface of the front wall 18a, as shown in FIG. 3. Three driven-side lugs 19 are arranged at equal intervals in the peripheral direction and each of them has a trapezoidal profile and tapered surfaces formed at its peripheral-direction ends. A retaining ring 20 with a pair of end portions, such as that shown in FIG. 9 is fitted in a rear end portion of the sleeve 18. A spring 21 is interposed in a compressed state between a spring receiving portion 22 and a retaining ring 20, thereby constantly urging the sleeve 18 rearward and, hence, the driven-side lugs 19 of the sleeve toward the driving-side lugs 17. A washer-like plate 23 is press-fitted into the sleeve 18 and is positioned between the rear ends of the body 10 and ones of the sleeve 18. The washer-like plate 23 serves as a dustproof member for preventing dust entering the interior of the sleeve 18. A drive shaft 24 which is driven and rotated by an electric motor is screwed into and fixed to a rear portion of the body 10.

Next, the operation of the first embodiment will be described.

The operation of fastening a tool by the jaws will be first described below. It is assumed here that, if the nut 14 is rotated clockwise (b) as viewed in FIG. 1, the jaws 12 advance to the right as viewed in FIG. 1 and fasten the tool, and that the jaws 12 have been opened by being moved leftward from the position indicated in FIG. 1. In this open state, the operator operates a power switch, while gripping by one hand, of the unit in which the electric motor is disposed, and the body 10 is rotated through the driving shaft 24 in the opposite direction (c) as viewed in FIG. 2. In response to this rotation, the three jaws 12 rotate integrally with the body 10 in the same direction, and the nut 14 in engagement with the jaws 12 and the engagement ring 16 integral with the nut 14 also rotate in the same direction. Also the sleeve 18 rotates in the same direction, since the spring 21 maintains the engagement between the driven-side lugs 19 formed in the sleeve 18 and the driving-side lugs 17 of the engagement ring 16 so that these lugs 17 and 19 mesh with each other. In this state, the operator grasps the sleeve 18 which is rotating, thereby stopping the sleeve 18 from rotating. This grasping also stops, through meshing between the lugs 17 and 19, the rotation of the nut 14 and the engagement ring 16 rotating in the above-described manner. Therefore, the nut 14 starts to rotate clockwise (b) relative to the jaws 12 that are rotating counterclockwise (c) and make the jaws 12 and the nut 14 advance rightward as viewed in FIG. 1 by the meshing between the internal thread portion 14a of the nut 14 and the external thread portions 13 of the jaws 12. As the jaws 12 advance, they abut against the outer peripheral surface of a tool (not shown) interposed between the jaws, and fasten the tool. If the fastening force reaches a certain torque, the meshing resistance between the nut 14 and the external threads 13 of the jaws 12 increases, the rotating force in the same direction as the rotating direction (b) of the jaws (12) increase in the nut 14. If this rotational force exceeds the engaging force of the lugs 17 and 19 produced by the urging force of the spring 21, the lugs 17 and 19 are disengaged from each other against the urging force of the spring 21. This disengagement allows the driving-side lugs 17 to rotate in the same direction as that of the body 10 and collide against the next/driven-side lugs 19. Since the driven-side lugs 19 are stationary, the impulsive force caused by the collision rotates the driven-side lugs 17 and, hence, the nut 14 in the direction opposite to that of the rotation of the jaws 12, thereby further increasing the force of fastening the jaws 12. If the sleeve 18 is further kept grasped, the collision and disengagement of the lugs 17 and 19 are repeated to further increase the fastening force of the jaws 12 because the rotational speed of the drive shaft 24 rotated by the electric motor is high. Thus, the tool can be tightly held by the jaws 12. The fastening force can be set as desired by changing the pressure of the spring 21 or the angle of the tapered surfaces formed on the lugs 17 and 19.

Next, the operation of removing the tool by releasing the jaws 12 from the state in which the jaws 12 tightly hold the tool will be described.

Figure 2:
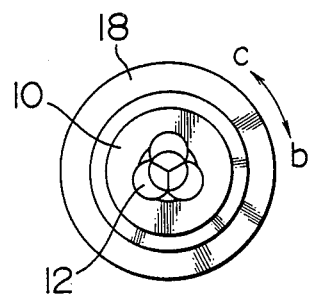

This operation is started by changing over the switch of the electric motor so as to rotate the drive shaft 24 and the body 10 in the direction opposite to that in the above case, that is, the clockwise direction (b) as viewed in FIG. 2. Thereafter, the operator grasps the sleeve 18 by the other hand in a manner similar to that described above. Then, the lugs 17 and 19 are first made to disengage from and collide against each other so that a strong rotational force is applied to the nut 14 in the direction opposite to that of the rotation of the jaws 12, thereby reducing the meshing resistance between the internal thread of the nut 14 and the external threads 13 of the jaws 12. If the resistance becomes smaller than the urging force of the spring 21, the nut 14 stops relative to the sleeve 18. As the jaws thereafter further rotate, the nut 14 starts to rotate relative to the jaws in the counterclockwise direction (c) opposite to the direction of rotation (b) of the jaws 12 so that the jaws move leftward as viewed in FIG. 1, thereby reducing the force of fastening the tool.

A second embodiment of the present invention will now be described below with reference to FIGS. 11 to 19.

Figure 13A:
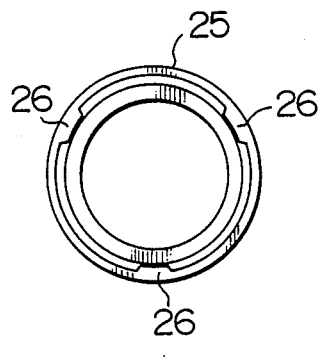
FIG. 13(A) is a rear view of a sleeve.
Figure 13B:
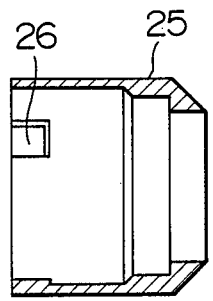
FIG. 13(B) is a sectional side view of the sleeve shown in FIG. 13(A)

In this embodiment, a body 10, oblique holes 11, jaws 12, external threads 13, a nut 14 are the same as those in the first embodiment. A sleeve 25 is rotatably fitted around the outer periphery of the body 10. As shown in FIG. 13, the sleeve 25 is in the form of a cylinder. The nut 14 is fixed to the internal surface of a front portion of the sleeve 25, and plurality driving-side engagement members 26 similar to the above-described driving-side lugs 17 are integrally formed on the surface of a rear portion of the sleeve 25 at equal intervals in the peripheral direction. A case 27 is loosely fitted around the outer periphery of a rear portion of the body 10, and an outer peripheral portion of the case 27 is loosely fitted to the outer periphery of a rear portion of the sleeve 25. As shown in FIG. 17, the case 27 has plurality radial grooves 28 formed on the inner surface of its rear wall at equal intervals in the peripheral direction thereof. The case 27 is prevented from disengaging from the body 10 by a snap ring 29 attached to the rear portion of the body. An engagement member 30 is provided in each groove 28 of the case 27 so that it can slide in the radial direction. Each engagement member 30 is in the form of a rectangular tube opened only at its bottom, as shown in FIG. 18, and is constantly urged outward by a spring 31. The engagement members 30 are positioned in such a manner that they can engage with the driving-side engagement members 26 formed on the sleeve 25. A flange 32 which guides the engagement members 30 so as to prevent them from inwardly deviating is integrally formed on a rear portion of the body 10.

The driving-side engagement members 26 formed in the sleeve 25 in this embodiment correspond to the driving-side lugs 17 formed in the nut 14 in the first embodiment, the engagement members 30 correspond to the driven-side lugs 19 formed in the sleeve 18 in the first embodiment, and the springs 31 correspond to the spring 21 of the first embodiment. Therefore, the fastening force of the jaws 12 can be increased by a course of action similar to that in the case of the first embodiment performed by rotating the body 10 counterclockwise (b) in the same direction as that in the case of the first embodiment and grasping the case 27 by the hand. Conversely, the fastening force of the jaws 12 can be reduced by a course of action similar to that in the case of the first embodiment performed by rotating the body 10 clockwise and grasping the case 27 by the hand.

What is claimed is:

1. A keyless chuck comprising:

a body having an axis of rotation and a peripheral circular groove, one end of said body being adapted for attachment to a drive shaft and the other end of aid body being adapted to hold a tool;

means defining oblique holes in said body diverging uniformly inward from said one end and arranged symmetrically and at equal intervals about said axis;

tool-engaging jaws having threads thereon and slidable in said holes;

a nut rotatable in said peripheral circular groove in said body about said axis, said groove intersecting said holes and said nut being in threaded engagement with said jaw threads to advance said jaws to grip a tool on rotation of said nut in one direction or retract the same to release a tool on rotation of said nut inn the opposite direction;

a manually-grippable member loosely fitted about the outer periphery of said body for rotation about said axis and for relative longitudinal displacement therebetween;

opposed means on said nut and on said member interengageable on said relative longitudinal displacement between said member and said body in one direction to yieldably couple said member to said nut against relative rotation therebetween and disengageable to decouple said member from said nut on a predetermined relative torque between said member and said nut; and spring means engaged between said member and said body to continuously urge, with a predetermined force, said relative longitudinal displacement therebetween in said one yieldable coupling direction, whereby rotation of said body in one direction or the opposite direction by a drive shaft will selectively advance or retract said jaws by manually restraining said member against rotation with said body and when said jaws encounter a predetermined resistance to further advancing or retracting movement and thus effect said predetermined torque, said spring force is overcome and said opposed means disengage and decouple said member from said nut.

2. The chuck defined in claim 1 wherein there are a plurality of the opposed means having inclined interengaging coupling surfaces whereby the urging force of said spring will be overcome and decouple the member from the nut on a predetermined relative torque therebetween and recouple the member to the nut after a predetermined extent of relative rotation therebetween.

* * * * *